United States Patent
Christ et al.

(10) Patent No.: US 10,960,771 B2
(45) Date of Patent: Mar. 30, 2021

(54) LIMP-HOME MODE FOR A VEHICLE WITH AN ELECTRIC DRIVE

(71) Applicant: Bayerische Motoren Werke Aktiengesellschaft, Munich (DE)

(72) Inventors: Thomas Christ, Munich (DE); Michael Rath, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 275 days.

(21) Appl. No.: 15/052,956

(22) Filed: Feb. 25, 2016

(65) Prior Publication Data
US 2016/0250944 A1    Sep. 1, 2016

(30) Foreign Application Priority Data
Feb. 26, 2015   (DE) .................... 10 2015 203 491.7

(51) Int. Cl.
| | | |
|---|---|---|
| *H02J 7/00* | (2006.01) | |
| *B60L 15/20* | (2006.01) | |
| *B60L 58/13* | (2019.01) | |
| *B60L 58/15* | (2019.01) | |

(52) U.S. Cl.
CPC ........... *B60L 15/2045* (2013.01); *B60L 58/13* (2019.02); *B60L 58/15* (2019.02); *Y02T 10/64* (2013.01); *Y02T 10/70* (2013.01); *Y02T 10/72* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,965,614 | B2* | 2/2015 | Nissato | B60K 6/442 180/65.1 |
| 9,061,599 | B2* | 6/2015 | Sisk | B60L 11/1864 |
| 9,211,804 | B2* | 12/2015 | Preece | H01M 10/44 |
| 2009/0205890 | A1 | 8/2009 | Diegelmann et al. | |
| 2011/0156652 | A1* | 6/2011 | Kishiyama | B60L 53/11 320/132 |
| 2011/0166732 | A1* | 7/2011 | Yu | B60W 10/26 701/22 |

(Continued)

FOREIGN PATENT DOCUMENTS

| | | |
|---|---|---|
| CN | 201155889 Y | 11/2008 |
| CN | 102745092 A | 10/2012 |

(Continued)

OTHER PUBLICATIONS

German-language Search Report issued in counterpart German Application No. 10 2015 203 491.7 dated Mar. 13, 2015 with partial English translation (Thirteen (13) pages).

(Continued)

*Primary Examiner* — Adam D Tissot
(74) *Attorney, Agent, or Firm* — Crowell & Moring LLP

(57) ABSTRACT

A method is provided for increasing the operating range of a vehicle which is driven by an electric motor. The method determines that a state of charge reserve of an energy store of the vehicle should be used for operating the electric motor. The state of charge reserve lies outside a state of charge range which is intended for the energy store. In response to this, the method uses electrical energy from the state of charge reserve of the energy store in order to operate the electric motor of the vehicle.

16 Claims, 2 Drawing Sheets

(56) References Cited

U.S. PATENT DOCUMENTS

| | | | | |
|---|---|---|---|---|
| 2012/0143410 A1* | 6/2012 | Gallagher | ............... | B60L 58/12 |
| | | | | 701/22 |
| 2012/0143435 A1* | 6/2012 | Cho | ........................ | B60L 58/12 |
| | | | | 701/33.4 |
| 2013/0181511 A1* | 7/2013 | Stewart | ............... | H01M 16/006 |
| | | | | 307/9.1 |
| 2014/0172206 A1* | 6/2014 | Roos | ..................... | B60K 6/442 |
| | | | | 701/22 |

FOREIGN PATENT DOCUMENTS

| | | |
|---|---|---|
| DE | 10 2008 009 568 A1 | 8/2009 |
| DE | 10 2010 034 444 A1 | 2/2012 |

OTHER PUBLICATIONS

Chinese-language Office Action issued in counterpart Chinese Application No. 201610107951.8 dated Oct. 8, 2019 with English translation (15 pages).

Chinese-language Office Action issued in Chinese Application No. 201610107951.8 dated Dec. 14, 2020 (10 pages).

* cited by examiner

LIMP-HOME MODE FOR A VEHICLE WITH AN ELECTRIC DRIVE

CROSS REFERENCE TO RELATED APPLICATIONS

This application claims priority under 35 U.S.C. § 119 from German Patent Application No. 10 2015 203 491.7, filed Feb. 26, 2015, the entire disclosure of which is herein expressly incorporated by reference.

BACKGROUND

The invention relates to a method and to a corresponding apparatus for increasing the operating range of an electric vehicle.

Vehicles with an electric drive (that is to say with an electric motor which is used for driving the vehicle) typically include an energy store which is designed to store electrical energy for operating the electric motor. The electrical energy for driving the vehicle (also called traction energy) is typically stored in the energy store in electrochemical form. Exemplary energy stores include one or more lithium-ion-based storage cells.

The electrical energy store has a limited capacity for storing traction energy. In this respect, the operating range of a vehicle which can be achieved with the limited capacity is currently relatively small in comparison to the operating range which can be achieved by a vehicle with an internal combustion engine. In addition, the number of public charging stations for electric vehicles is relatively limited at present. Therefore, in the case of an electric vehicle, there is an increased risk of the electric vehicle not being able to reach a desired destination with the available electrical energy and of the electric vehicle possibly being "left stranded".

SUMMARY OF THE INVENTION

The present application addresses the technical problem of efficiently reducing the risk of an electric vehicle not having enough electrical energy to reach a desired destination. A particular aim is to efficiently enable a driver of an electric vehicle to increase the operating range of the electric vehicle as required.

The problem is solved by a method for increasing the operating range of a vehicle which is driven by an electric motor, as well as a control unit for carrying out the method, wherein the method includes: determining that a state of charge reserve of an energy store of the vehicle should be used for operating the electric motor; wherein the energy store is designed to store electrical energy and wherein the state of charge reserve lies outside a state of charge range intended for the energy store; and, in response to this, using electrical energy from the state of charge reserve of the energy store in order to operate the electric motor of the vehicle.

A method for increasing the operating range of a vehicle which is driven by an electric motor is described according to one aspect. The vehicle is, for example, a road vehicle, such as a passenger car or a truck. The method determines that a state of charge reserve of an energy store of the vehicle should be used for operating the electric motor.

The energy store is designed to store electrical energy, wherein the quantity of electrical energy in the energy store is typically indicated by a state of charge (SOC) of the energy store. The energy store usually includes one or more storage cells, for example one or more lithium-ion-based storage cells. The energy store is usually operated in a standard operating mode in which the energy store is not fully charged and/or not fully discharged in order to achieve as long a service life of the energy store as possible (that is to say, as high a number of storage cycles as possible). The energy store can, for example in the standard operating mode, be discharged down to a minimum permissible state of charge (wherein the minimum permissible state of charge is greater than 0%) and/or can be charged up to a maximum permissible state of charge (wherein the maximum permissible state of charge is less than 100%). In other words, in the standard operating mode, the energy store can be operated in a state of charge range which is intended (or permissible) for the energy store. In this case, the intended state of charge range can be limited at the lower end by the minimum permissible state of charge and/or at the upper end by the maximum permissible state of charge.

The state of charge reserve lies outside the state of charge range which is intended for the energy store. The state of charge reserve can include, for example, a lower state of charge reserve in which a state of charge of the energy store lies below the minimum permissible state of charge (possibly all the way down to a minimum possible state of charge of, for example, 0%). As an alternative or in addition, the state of charge reserve can include an upper state of charge reserve of which the state of charge of the energy store lies above the maximum permissible state of charge (possibly as high as up to a maximum possible state of charge of, for example, 100%).

During operation of the energy store within the intended state of charge range, a service life of the energy store is typically reduced statistically less than during operation of the energy store within the state of charge reserve. It is therefore usually advantageous (for the service life of the energy store) to operate the energy store in the standard operating mode, that is to say within the intended state of charge range, as standard. Otherwise, the state of charge reserve of the energy store should be used only in exceptional cases since use of the state of charge reserve of the energy store typically statistically leads to a reduction in the service life of the energy store (in comparison to exclusive use in the intended state of charge range).

The method therefore determines that (as an exception) the state of charge reserve of the energy store should be used for operating the electric motor of the vehicle. This operating mode of the energy store can be called the capacity-extending operating mode of the energy store. It is therefore possible to determine that the capacity-extending operating mode of the energy store, in which capacity-extending operating mode not only the intended state of charge range but also the state of charge reserve of the energy store is used for operating the electric motor in order to drive the vehicle, should be activated.

In response to determining that the capacity-extending operating mode of the energy store should be activated, the method further includes using electrical energy from the state of charge reserve of the energy store in order to operate the electric motor of the vehicle (that is to say in order to drive the vehicle). The use of the state of charge reserve of the energy store can be limited to a predefined number of charging cycles of the energy store (for example to a single charging cycle). That is to say, the method can further include restricting the use of the state of charge reserve of the energy store to a predefined, limited number of charging cycles. After the limited number of charging cycles, the energy store can automatically move from the capacity-extending operating mode to the standard operating mode. The capacity-extending operating mode can then be reactivated possibly only by an explicit user request/input.

The usable capacity of the energy store can be extended, and therefore the operating range of a vehicle can be increased as required, in an efficient manner by the method described herein. Furthermore, damage to the energy store is limited by the selective provision of the state of charge reserve of the energy store.

Determining that the state of charge reserve of the energy store should be used can include detecting an input by a user of the vehicle by means of an input/output unit of the vehicle. In particular, it may be necessary for the user of the vehicle (for example the driver of the vehicle or an occupant of the vehicle) to explicitly request the state of charge reserve of the energy store by way of a human-machine interface of the vehicle. Furthermore, it is possible to determine whether the user of the vehicle accepts one or more conditions (for example changes in warranty conditions for the energy store and/or payment conditions for the use of the state of charge reserve of the energy store) for using the state of charge reserve. This can likewise be determined by use of the human-machine interface of the vehicle. The use of electrical energy from the state of charge reserve may possibly be allowed only when it is determined that the user of the vehicle has accepted the one or more conditions. In other words, the activation of the capacity-extending operating mode of the energy store may possibly take place only when the user has accepted the one or more conditions. On the other hand, the energy store may possibly remain in the standard operating mode.

Damage to the energy store by excessive use of the state of charge reserve can be limited by the requirement of an explicit input by a user of the vehicle and by optionally linking the use of the state of charge reserve of the energy store with one or more conditions. Furthermore, the use of the state of charge reserve can be offered to a user as a value-added function of the vehicle (possibly in exchange for payment).

The method can further include activating one or more measures by which consumption of electrical energy by the vehicle is reduced while electrical energy from the state of charge reserve is used for operating the electric motor. It can be assumed that, when a user activates the capacity-extending operating mode of the energy store, the user of the vehicle wishes to maximize the operating range of the vehicle. It may therefore be advantageous for one or more consumption-reducing measures (for example deactivating an air-conditioning system and/or restricting a driving speed of the vehicle) to be carried out, possibly automatically, when the capacity-extending operating mode of the energy store is activated. The operating range of the vehicle can be further increased in this way.

As already explained above, the state of charge reserve can include a lower state of charge reserve in which a state of charge of the energy store falls below the minimum permissible state of charge. The lower state of charge reserve can be provided during driving of the vehicle in order to increase the operating range of the vehicle (for example to reach a destination). In particular, it is possible to determine during driving of the vehicle that the lower state of charge reserve should be used. Therefore, a so-called LIMP-HOME function can be provided for the vehicle.

As an alternative or in addition, the state of charge reserve can include an upper state of charge reserve in which the state of charge of the energy store is moved above the maximum permissible state of charge. It is possible to determine during a charging process of the energy store (for example at a charging station) that the upper state of charge reserve should be used. The quantity of electrical energy available for an imminent trip can be increased in advance in this way.

A control unit (for example a control device) for a vehicle is described according to a further aspect. The vehicle comprises an electric motor for driving the vehicle. The control unit is designed to determine that a state of charge reserve of an energy store of the vehicle should be used for operating the electric motor. The energy store is designed to store electrical energy, and the state of charge reserve of the energy store lies outside a state of charge range which is permissible (or intended) for the energy store. That is to say, the energy store is typically operated within the state of charge range as standard. The control unit is further designed to induce electrical energy from the state of charge reserve of the energy store to be used in order to operate the electric motor of the vehicle.

The energy store can include one or more storage cells, the service life of said storage cells statistically dropping increasingly sharply when the storage cells are charged to a state of charge which lies above a maximum permissible state of charge and/or when the storage cells are discharged down to a state of charge which drops below a minimum permissible state of charge. In particular, the service life can fall more sharply in the abovementioned cases than when the one or more storage cells are operated exclusively below the maximum permissible state of charge and/or above the minimum permissible state of charge.

The vehicle can be designed to operate the energy store in the standard operating mode exclusively in the permissible state of charge range. Therefore, the state of charge reserve of the energy store of the vehicle is not used for operating the electric motor in the standard operating mode. Otherwise, the state of charge reserve can also be used in addition to the permissible state of charge range in the capacity-extending operating mode.

A vehicle (for example a passenger car, a truck or a motorcycle) which is equipped with the control unit described herein is described according to a further aspect.

A software (SW) program is described according to a further aspect. The SW program can be designed to be run on a processor (for example on a control device) and in this way to execute the method described herein.

A storage medium is described according to a further aspect. The storage medium can include an SW program which is designed to be run on a processor and in this way to execute the method described herein.

It should be noted that the methods, apparatuses and systems described in this document can be used both on their own and also in combination with other methods, apparatuses and systems described in this document. Furthermore, any aspects of the methods, apparatuses and systems described in this document can be combined with one another in a variety of ways. In particular, the features of the claims can be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As explained at the outset, the present application addresses the technical problem of efficiently enabling the user of an electric vehicle to increase the operating range of the electric vehicle as required.

Figure 1:
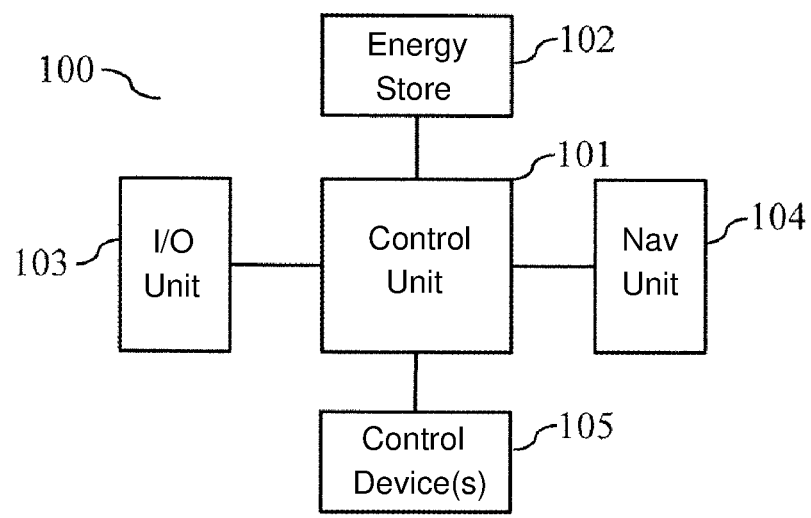
FIG. 1 is a highly schematic block diagram of exemplary components of a vehicle.

FIG. 1 shows a block diagram containing exemplary components of a vehicle 100. In particular, the vehicle 100 includes an energy store 102 which is designed to provide electrical energy for operating an electric motor of the vehicle 100 and a control unit 101. The energy store 102 is designed to determine a state of charge (SOC) of the energy store 102 and to provide that to the control unit 101. The control unit 101 can be designed to determine a remaining operating range of the vehicle 100 on the basis of the state of charge of the energy store 102.

The vehicle 100 can further include a navigation unit 104 which is designed to determine a position of the vehicle 100 and/or a planned route for the vehicle 100. The control unit 101 can be designed to determine whether the vehicle 100 can set off on the planned route in view of the remaining operating range. For example, it may be determined that the planned route is too long in view of the current state of charge of the energy store 102, and therefore that the destination cannot be reached.

Figure 2:
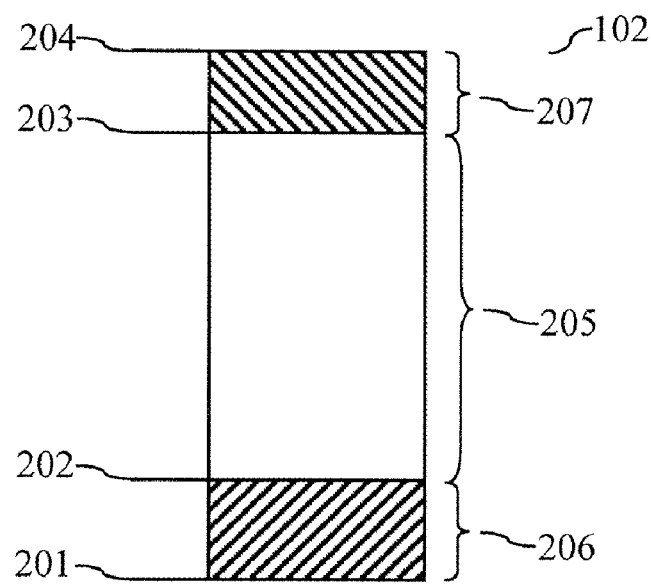
FIG. 2 is a diagram of exemplary states of charge of an energy store.

In order to increase the service life of an energy store 102 (in particular of an electrochemical energy store, such as a lithium-ion-based energy store for example), an energy store 102 is typically operated in a state of charge range by which the effectively available capacity of the energy store 102 is reduced in comparison to a maximum capacity of the energy store 102. This is illustrated in FIG. 2 by way of example. The energy store 102 has a maximum possible capacity which is represented by the entire bar. The maximum possible capacity is reached at a maximum possible state of charge 204 (of typically 100% SOC). In order to increase the service life of the energy store 102, the energy store 102 is typically charged only up to a maximum permissible state of charge 203 (of typically 80-90% SOC). The maximum permissible state of charge 203 lies below the maximum possible state of charge 204, and therefore the energy store 102 has an effectively available capacity which is lower than the maximum possible capacity of the energy store 102.

Analogously, it is typically advantageous to not completely empty the energy store 102 (down to the minimum possible state of charge 201, of 0% SOC for example). Instead, the energy store 102 is discharged down to a minimum permissible state of charge 202 (of 10-20% SOC for example) during normal operation (that is to say in a standard operating mode) in order to increase the service life of the energy store 102.

Therefore, the energy store 102 is operated between a minimum permissible state of charge 202 and a maximum permissible state of charge 203 during normal operation of an electric vehicle (that is to say in the standard operating mode). The effectively available (that is to say directly usable) capacity of the energy store 102 is therefore given by the capacity which lies between the minimum permissible state of charge 202 and the maximum permissible state of charge 203. As long a service life of the energy store 102 as possible can be achieved by limiting the states of charge. Otherwise, it can be expected that operation of the energy store 102 outside the permissible state of charge range 205 between the states of charge 202 and 203 will cause a relatively large reduction in the service life of the energy store 102.

Figure 3:
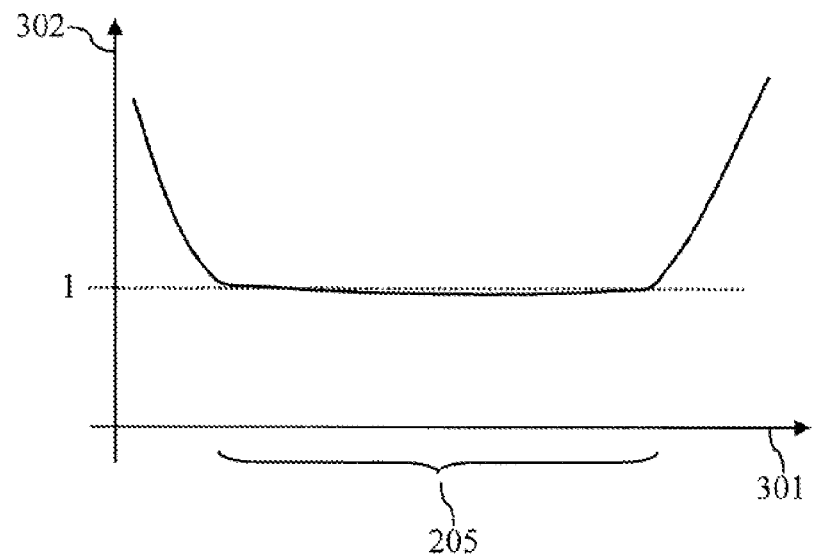
FIG. 3 is a graph of exemplary effects of a charging cycle on the service life of an energy store.

FIG. 3 illustrates, by way of example, the reduction in the service life of an energy store 102 which is caused by one charging cycle. The minimum and, respectively, the maximum actual states of charge 301 which occur during the charging cycle of the energy store 102 are plotted on the x axis, and the reduction 302 in the service life of the energy store 102 (in number of charging cycles still available) is indicated on the y axis. This figure shows that the service life of the energy store 102 falls more sharply during operation outside the permissible state of charge range 205 than during operation within the permissible state of charge range 205. For example, the service life of the energy store 102 is statistically reduced by precisely one charging cycle when the energy store 102 is operated exclusively within the permissible state of charge range 205 in a current charging cycle. On the other hand, use of the energy store 102 in the current charging cycle outside the permissible state of charge range 205 leads to a statistical reduction 302 in the service life by more than one charging cycle.

The vehicle 100 can have an input/output unit 103 which is designed to output information (in audible and/or visual form) to a user of the vehicle 100 and/or to detect inputs by the user of the vehicle 100. In particular, the input/output unit 103 can provide a human-machine interface (HMI). A user is able to use the input/output unit 103 of the vehicle 100 to induce the energy reserves which arise owing to operation of the energy store 102 outside the permissible state of charge range 205 to be provided.

For example, the user of the vehicle 100 can use the input/output unit 103 to induce a lower state of charge reserve 206 (below the minimum permissible state of charge 202) to be at least partially provided for operating the electric motor of the vehicle 100 during driving of the vehicle 100. This enables the occupant of the vehicle 100 to increase the operating range of the vehicle 100 by means of the lower state of charge reserve 206 in order to reach a desired destination.

Furthermore, the control unit 101 can be designed to induce one or more control devices 105 of the vehicle 100 to switchover into an energy-saving mode when it has been identified that the user of the vehicle 100 wishes to use the lower state of charge reserve 206. For example, an air-conditioning system of the vehicle 100 can be deactivated and/or a driving speed and/or an acceleration of the vehicle 100 can be limited. In other words, the control unit 101 can be designed to take measures by which energy consumption by the vehicle 100 can be reduced in order to further increase the operating range of the vehicle 100 which can be achieved with the lower state of charge reserve 206.

As an alternative or in addition, the user of the vehicle 100 can use the input/output unit 103 to induce an upper state of charge reserve 207 (above the maximum permissible state of charge 203) to be at least partially provided for operating the electric motor of the vehicle 100 during a charging process of the vehicle 100. The energy store 102 may then possibly be charged up to the maximum possible state of charge 204 during the charging process. This enables the occupant of the vehicle 100 to prepare the vehicle 100 to travel a particularly long distance. In particular, the operating range of the vehicle 100 can be increased even before a trip in this way.

The control unit 101 may possibly induce consumption-reducing measures when using the upper state of charge reserve 207 too.

The control unit 101 can be designed to output information relating to the activation of the state of charge reserves 206, 207 to the user of the vehicle 100 and/or to receive confirmations from the user of the vehicle 100 by means of the input/output unit 103. For example, the user of the vehicle 100 can be advised that the activation of the state of charge reserves 206, 207 can lead to a reduction in the service life of the energy store 102 and that a warranty for the energy store 102 may be voided by activating the state of charge reserves 206, 207. Furthermore, the user of the vehicle 100 can be prompted to confirm certain conditions for activating the state of charge reserves 206, 207. For example, the user of the vehicle 100 can be prompted to accept amended warranty conditions for the energy store 102 and/or to make a payment for using the state of charge reserves 206, 207. It may be possible to complete a payment process by means of the input/output unit 103.

The user of the vehicle 100 can therefore activate a LIMP-HOME mode of the vehicle 100 using a human-machine interface which is provided by means of the input/output unit 103. In the LIMP-HOME mode, the vehicle 100 can use the energy reserves 206, which are typically held in reserve in the energy store 102 from service life points of view, to drive the vehicle 100. At the same time, the vehicle 100 can be changed over to a particularly energy-efficient mode. For example, the driving speed and/or the acceleration of the vehicle 100 can be limited, and/or secondary loads, such as the air-conditioning system for example, can be switched off.

In order to resolve the conflict of objectives with a warranty for the energy store 102, which conflict arises from activating the LIMP-HOME mode, activation of the LIMP-HOME mode can be made dependent on the payment of a fee by the user of the vehicle 100. The proceeds of this can then be used to cover increased warranty claims which may arise due to activation of the LIMP-HOME mode.

As already explained above, an upper and/or a lower state of charge reserve 206, 207 can be made available. Therefore, an extended operating range can be provided both over short distances (that is to say for a so-called LIMP-HOME operation) and for long distances. The method described herein therefore enables the operating range of a vehicle 100 with an electric drive to be increased as required in a flexible and simple manner.

Figure 4:
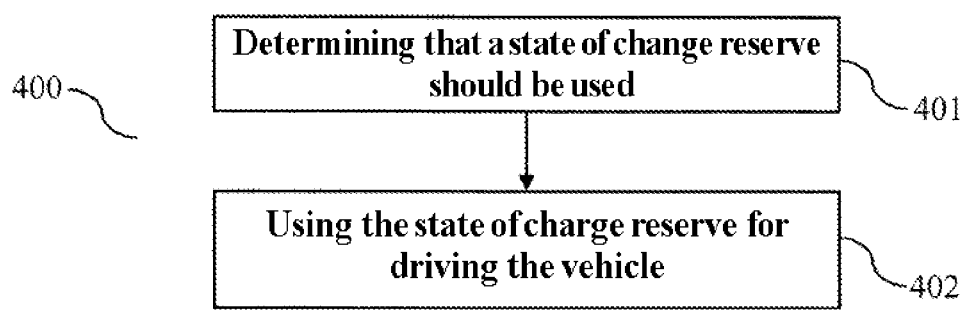
FIG. 4 is a flowchart of an exemplary method for selectively providing energy reserves for a vehicle with an electric drive.

FIG. 4 shows a flowchart of an exemplary method 400 for increasing the operating range of a vehicle 100 which is driven by an electric motor. The method 400 includes determining 401 that a state of charge reserve 206, 207 of an energy store 102 of the vehicle 100 should be used for operating the electric motor. The energy store 102 is designed to store electrical energy for operating the electric motor. The energy store is operated in an intended or permissible state of charge range 205 in a standard operating mode. In this way, a reduction in the service life of the energy store 102 can be kept as low as possible in the standard operating mode and nevertheless enough storage capacity for operating the electric motor can be held in reserve.

On the other hand, it can be determined that the energy store (typically as an exception) should be operated in a capacity-extending operating mode. That is to say, it can be determined that, in addition to the intended state of charge range 205, a state of charge reserve 206, 207 of the energy store 102 should be used for operating the electric motor. In this case, the state of charge reserve 206, 207 lies outside the state of charge range 205 intended for the energy store 102 and in this way extends the available (that is to say the usable) storage capacity of the energy store 102. Otherwise, the service life of the energy store 102 is typically statistically reduced (in comparison to exclusive operation within the intended state of charge range 205) by operation of the energy store 102 using the state of charge reserve 206, 207. Determining 401 that the state of charge reserve 206, 207 should be used (that is to say that the capacity-extending operating mode should be activated) can be performed by means of a human-machine interface of the vehicle 100.

In response to determining 401 that the state of charge reserve 206, 207 should be used, the method 400 further comprises using 402 electrical energy from the state of charge reserve 206, 207 of the energy store 102 in order to operate the electric motor of the vehicle 100. The state of charge reserve 206, 207 is typically used only in a single charging cycle of the energy store 102 (or only for a specific number of charging cycles). That is to say, the energy store 102 typically automatically switches back from the energy-extending operating mode to the standard operating mode. In particular, it may be necessary for the capacity-extending operating mode to be explicitly reactivated by way of a human-machine interface of the vehicle 100 for each charging cycle of the energy store 102 (or for each group of charging cycles).

The selective provision of an energy-extending operating mode for the energy store 102 of the vehicle 100 allows the operating range of the vehicle 100 to be increased in a flexible manner. Secondly, automatic return to the standard operating mode prevents the energy store 102 from being damaged by regular activation of the capacity-extending operating mode (that is to say by regular use of the state of charge reserve 206, 207).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for increasing the operating range of a vehicle which is driven by an electric motor, the method comprising the acts of:
   determining via an ECU that a state of charge reserve range of an energy store of the vehicle must be used for operating the electric motor, wherein
      the energy store is configured to store electrical energy, and
      the state of charge reserve range lies outside a given state of charge range, the given state of charge range being a charge range that reduces a service life of the energy store less during operation of the energy store therewithin than when the energy store is operated within the state of charge reserve range; and
   determining whether a user of the vehicle accepts at least one condition, before using the state of charge reserve range, wherein the at least one condition is a change in warranty conditions for the energy store, and
   in response to the determination, using electrical energy from the state of charge reserve range of the energy store in order to operate the electric motor of the vehicle.

2. The method as claimed in claim 1, wherein, during operation of the energy store within the given state of charge range, a service life of the energy store is reduced statistically less than during operation of the energy store within the state of charge reserve range.

3. The method as claimed in claim 1, wherein:
the given state of charge range extends from a minimum permissible state of charge to a maximum permissible state of charge of the energy store; and
the state of charge reserve includes one or more of:
a lower state of charge reserve in which a state of charge of the energy store lies below the minimum permissible state of charge; and
an upper state of charge reserve in which the state of charge of the energy store lies above the maximum permissible state of charge.

4. The method as claimed in claim 1, wherein the act of determining comprises the act of detecting an input by a user of the vehicle via of an input/output unit of the vehicle.

5. The method as claimed in claim 1, further comprising the acts of:
determining whether a user of the vehicle accepts one or more conditions for using the state of charge reserve; and
using electrical energy from the state of charge reserve for operating the electric motor only when it is determined that the user of the vehicle accepts the one or more conditions.

6. The method as claimed in claim 5, further comprising the act of activating one or more measures by which consumption of electrical energy by the vehicle is reduced while electrical energy from the state of charge reserve is used for operating the electric motor.

7. The method as claimed in claim 1, further comprising the act of activating one or more measures by which consumption of electrical energy by the vehicle is reduced while electrical energy from the state of charge reserve is used for operating the electric motor.

8. The method as claimed in claim 1, wherein:
the state of charge reserve comprises a lower state of charge reserve in which a state of charge of the energy store falls below a minimum permissible state of charge; and
it is determined during driving of the vehicle that the lower state of charge reserve must be used.

9. The method as claimed in claim 8, wherein:
the state of charge reserve comprises an upper state of charge reserve in which a state of charge of the energy store is moved above a maximum permissible state of charge; and
during a charging process of the energy store, determining that the upper state of charge reserve must be used.

10. The method as claimed in claim 1, wherein:
the state of charge reserve comprises an upper state of charge reserve in which a state of charge of the energy store is moved above a maximum permissible state of charge; and
during a charging process of the energy store, determining that the upper state of charge reserve must be used.

11. A control unit for a vehicle equipped with an electric motor for driving the vehicle, wherein the control unit executes a program to:
determine via an ECU that a state of charge reserve range of an energy store of the vehicle must be used for operating the electric motor, wherein the energy store is configured to store electrical energy and the state of charge reserve range lies outside a given state of charge range,
the given state of charge range being a charge range that reduces a service life of the energy store less during operation of the energy store therewithin than when the energy store is operated within the state of charge reserve range; and
determining whether a user of the vehicle accepts at least one condition, before using the state of charge reserve range, wherein the at least one condition is a change in warranty conditions for the energy store, and
in response to the determination, using electrical energy from the state of charge reserve range of the energy store in order to operate the electric motor of the vehicle.

12. The control unit as claimed in claim 11, wherein:
the energy store comprises one or more storage cells, the service life of said storage cells statistically dropping when said storage cells are charged to a state of charge which lies above a maximum permissible state of charge and/or when said storage cells are discharged down to a state of charge which drops below a minimum permissible state of charge; and/or
the vehicle is designed to operate the energy store exclusively in the permissible state of charge range in a standard operating mode.

13. The method according to claim 1, wherein use of the energy store, in a current charge cycle, within the charge reserve range results in reduction in service life of the energy store of more than once charging cycle.

14. The control unit according to claim 11, wherein use of the energy store, in a current charge cycle, within the charge reserve range results in reduction in service life of the energy store of more than once charging cycle.

15. The method according to claim 1, wherein the at least one condition is a payment to use the state of charge reserve of the energy store.

16. The method according to claim 11, wherein the at least one condition is a payment to use the state of charge reserve of the energy store.

* * * * *